US005761985A

United States Patent [19]

Stoll

[11] Patent Number: 5,761,985

[45] Date of Patent: Jun. 9, 1998

[54] FLUID POWER CYLINDER

[75] Inventor: Kurt Stoll, Esslingen, Germany

[73] Assignee: Festo KG, Esslingen, Germany

[21] Appl. No.: 744,103

[22] Filed: Nov. 5, 1996

[30] Foreign Application Priority Data

Nov. 7, 1995 [DE] Germany ........................ 295 17 615.6

[51] Int. Cl.[6] ........................................................ F16J 15/18

[52] U.S. Cl. ..................................... 92/165 PR; 92/165 R

[58] Field of Search ............................. 92/165 R, 165 PR

[56] References Cited

U.S. PATENT DOCUMENTS

| | | | |
|---|---|---|---|
| 817,381 | 4/1906 | Matson | 92/165 R |
| 2,129,898 | 9/1938 | Wright | 92/165 R |
| 4,854,218 | 8/1989 | Stoll | 92/165 R |

FOREIGN PATENT DOCUMENTS

| | | |
|---|---|---|
| 3820333 A1 | 6/1988 | Germany . |
| 0 346 716 B1 | 6/1989 | Germany . |
| 295 07 688 U | 4/1995 | Germany . |

*Primary Examiner*—F. Daniel Lopez

*Attorney, Agent, or Firm*—Hoffmann & Baron, LLP

[57] ABSTRACT

A fluid power cylinder comprises a terminally arranged piston rod guide device through which a guide station of the piston rod with a prismatic cross section runs. Two diametrally opposite prism side edges of the guide section fit into circumferentially extending guide grooves in a plurality of guide rollers, the surface sections, which laterally adjoin prism side edges, of the guide section being supported by the flanks of the guide grooves.

13 Claims, 1 Drawing Sheet

FLUID POWER CYLINDER

BACKGROUND OF THE INVENTION

The invention relates to a fluid power cylinder comprising a piston rod guide device arranged at an end of the cylinder and through which a guide section, of polygonal cross section, of the piston rod extends and which possesses a base, on which laterally adjacent to the piston rod a guide roller arrangement rollingly engaging the piston rod is mounted for rotation and is adapted both to provide for transverse support of the piston rod and also to ensure rotational locking of the piston rod around the axis thereof.

THE PRIOR ART

A power cylinder of this type is disclosed in the German utility model 29,507,688.7. It possesses a circular piston rod having a flat to create a two-cornered cross section. A ball bushing, which cooperates with the circularly cylindrical cross section of the piston rod, is instrumental in providing for transverse support. An additionally provided guide roller arrangement comprises a guide roller rotatably mounted on the base to run on the flat on the piston rod. Besides providing for transverse support this guide roller is also responsible for rotational locking of the piston rod.

When the piston rod is subject to a high torque in operation, the guide roller may in some cases be unable to cope with such torques. The prior art power cylinder is consequently more suitable for applications involving only a small torque load on the piston rod.

SHORT SUMMARY OF THE INVENTION

One object of the invention is to create a fluid power cylinder of the sort noted initially which while providing for satisfactory transverse support of the piston rod, also reliably ensures rotational locking of the piston rod even under a high torque load.

In order to achieve these and/or other objects appearing from the present specification, claims and drawings, in the present invention at least the guide section of the piston rod possesses a prismatic configuration, two prism side edges diametrally opposite to one another as related to the longitudinal axis of the piston rod defining guide regions for cooperation with the guide roller arrangement because each of such prism side edges has at least one guide roller for it, such guide roller having a peripherally extending guide groove into which the respective prism side edge fits so that the prism's surface portions, laterally adjoining a respective prism lateral edge on either side and converging at an angle toward one another as seen in cross section with the formation of guide surfaces, are supported by the flanks of the associated guide groove.

It is in this manner that the piston rod is reliably supported as regards transverse forces by the guide rollers running against diametrally opposite side portions of the prismatic guide section. Furthermore there is a satisfactory supporting action at a right angle to the plane of the rollers, in which the guide rollers are aligned, seeing that the prismatic guide section having the prism's side edges fits into the associated guide grooves so that the groove flanks are in cooperating contact with the surface sections of the prism longitudinally adjoining the side edges of the prism. The interlocking fit or engagement so produced furthermore ensures support of the guide section in the peripheral direction and locks the piston rod against rotational movement thereof even under a high torque load. Even when the entire piston rod has prismatic configuration, the part in which the piston rod passes through the associated cylinder end plate may be sealed off with a suitably shaped sealing ring without any problems with the result that no trouble with leaks occurs.

Although the German patent publication 3,820,333 A1 has already disclosed guide rollers for supporting the piston rod of a vibration damper, in this case the piston rod has a circular cross section and no rotational locking effect is produced.

In the case of a fluid power cylinder as disclosed in the European patent publication 0 346 716 B1 transverse support and rotational locking of the piston rod was provided for by bearing balls carried in the housing and running in longitudinal grooves in the piston rod. The resulting customized cross sectional configuration of the piston rod however impairs sealing necessary to prevent loss of fluid from the fluid power cylinder.

Further advantageous developments of the present invention are defined in the claims.

It is convenient if at least one of the two side edges of the prism are provided with a plurality of guide rollers, arranged with a spacing between them in the longitudinal direction of the piston rod. It is in this manner that there is a transverse supporting action along a major axial length, something rendering possible a high load carrying capacity of the piston rod.

In accordance with a preferred design of the invention one of the two lateral edges of the prism cooperates with two guide rollers spaced apart in the axial direction, whereas the opposite prism side edge only has one associated guide roller, which preferably runs against the piston rod generally centrally in the longitudinal portion between the two other guide rollers.

A presently favored form of embodiment comprises respectively two, or at least two, guide rollers associated with both prism side edges, such guide rollers being arranged in the longitudinal direction of the piston rod with a spacing between them. Preferably the guide rollers of the two prism side edges are opposite each other in pairs with the result as a convenient form of the invention that the portions at which force is applied are at a right angle to the longitudinal axis of the piston rod.

The guide rollers are preferably in the form of anti-friction bearing means so that there is a low-friction, freely running supporting action at the bearing even when heavy transverse forces are acting.

The guide rollers may readily be multiple part rollers and respectively possess two independently rotatable roller units, which respectively run on one of the two guide surfaces of a respective prism side edge. The axes of rotation of the roller units of a respective guide roller preferably coincide so that a supporting action on a common bearing axis is possible.

The preferred cross sectional shape of the guide section a square one.

More particularly for purposes of saving in weight the piston rod may be made hollow at least adjacent to the guide section.

Further advantageous developments and convenient forms of the invention will be understood from the following detailed descriptive disclosure of two embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
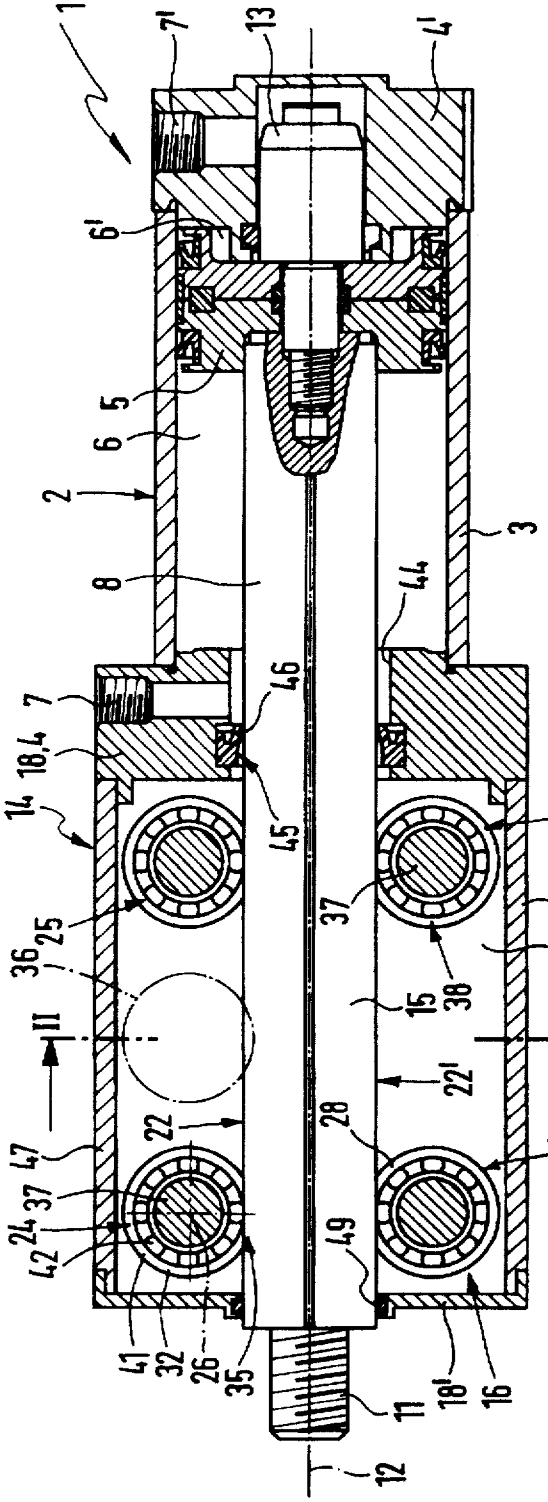
FIG. 1 is a longitudinal section taken through a first embodiment of the fluid power cylinder in a diagrammatic representation corresponding to the section line I—I of FIG. 2.

The power cylinder 1 illustrated by way of example comprises a housing 2 with a cylinder barrel 3 and end plates closing same at the ends, that is to say a bearing end plate 4 and a terminating end plate 4'.

In the interior of cylinder barrel 3 a piston 5 is mounted for axial sliding movement in a known manner. It divides off two working spaces 6 and 6' in a sealing fashion from one another. Into each working space 6 and 6' there opens a fluid duct 7 and 7' extending in the associated end plate 4 and 4', via which the drive fluid, in the present case compressed air, may be supplied and let off in order to move the piston 5 in the longitudinal direction as a sliding movement.

On the piston 5 a piston rod 8 is attached, same extending in the longitudinal direction of the housing 2. Its longitudinal axis is indicated at 12 in broken lines. It extends through the bearing end plate 4 in the axial direction, the piston rod section located outside the housing 2 being available for the attachment of any object to be moved. For this purpose the piston rod 8 possesses a suitable attachment adapter 11 on its axial end opposite to the piston 5.

On its side opposite to the piston rod 8 the piston 5 bears a dashpot piston 13 adapted for cooperation with the terminating end plate 4' for fluid end-position damping. It would be possible to provide a continuous piston rod also extending through the terminating end plate 4'.

The end side of the housing 2 through which the piston rod 8 passes is provided with a piston rod guide device 14. Through it there extends a section of the length of the piston rod 8 which we will term the guide section 15.

The piston rod guide device 14 guides and laterally supports the piston rod 8 during its axial movement which it performs owing to the action of fluid on the piston 5. Simultaneously the piston rod 8 is rotationally locked, i. e. prevented from rotating about its longitudinal axis 12 in relation to the housing 2. It is in this manner that the fluid power cylinder may be caused to perform tasks requiring accurate positioning with a high degree of precision, even if the piston rod 8 should be subject to a heavy transverse load and/or heavy torques.

The piston rod guide device 14 comprises a guide roller arrangement generally referenced 16, which is mounted for rotation on a base 17 fixedly joined to the housing 2. The base 17 is mounted axially on the cylinder barrel 3 or on the housing 2, it having in the present embodiment of the invention a terminal wall 18, which simultaneously constitutes the bearing end plate 4.

In the illustrated working embodiment of the invention the base 17 is designed in the form of a housing, which accommodates the guide roller arrangement and provides a convenient means for shielding it against dirt.

Figure 2:
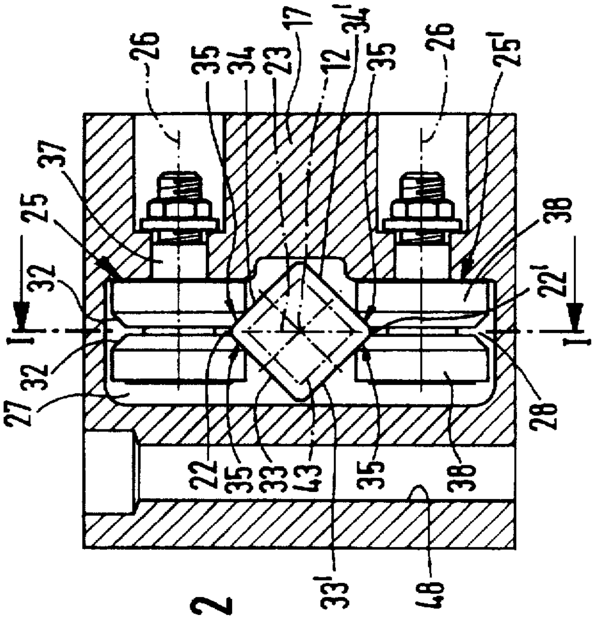
FIG. 2 is as cross section taken through the power cylinder of FIG. 1 on the section line II—II of FIG. 1.

At least the guide section 15 and preferably the piston rod 8 as a whole has a prismatic shape. The cross sectional configuration particularly well illustrated in FIG. 2 as a regular prism with a square outline is preferred.

The prism constituting the guide section 15 possesses a plurality of side edges extending in parallelism to the longitudinal axis 12. At least two of such prism side edges 22 and 22' are in diametral relationship to each other across, that is to say athwart, the longitudinal axis 12 of the piston rod 8. They extend in a common guide plane 23 indicated in more detail in FIG. 2, such plane extending axially and radially.

Each of the two above mentioned side edges 22 and 22' of the prism is provided with at least one guide roller 24, 25; 24' and 25'. These rollers are rotatably mounted on the base 17 with axes 26 of rotation extending at a right angle to the guide plane 23. The guide rollers 24, 25; 24' and 25' are arranged to the side adjacent to the guide section 15 and are preferably arranged in a common housing chamber 27 in the base 17, which also has the guide section 15 extending through it. In this respect at the said two prism side edges 22 and 22' the guide section 15 is acted upon radially by the guide rollers 24, 25; 24' and 25' on opposite sides.

Each guide roller 24, 25; 24' and 25' has a radially open circumferential guide groove 28 in its outer periphery. This groove extends in the same guide plane 22 and 22' as the side edges 22 and 22' of the prism. Each prism side edge 22 and 22' fits into the guide groove 28 of the associated guide roller 24, 25; 24' and 25'.

Two flat prism side surfaces converge together, preferably at an acute angle at the respective prism side edges 22 and 22'. The surface sections, directly adjoining a respective prism side edge 22 and 22', of such prism side surfaces 33, 34; 33' and 34' represent guide surfaces 35 converging together at an angle, the groove flanks 32 (which have a complementary shape) of the guide rollers cooperating with the guide rollers 24, 25; 24' and 25'. Thus a transverse supporting action and simultaneously (owing to the radial engagement of the guide surfaces 35 with the respective guide groove 28) a rotational locking effect with respect to the piston rod 8 is produced. Lines perpendicular to the guide surfaces 35 do not intersect the longitudinal axis 12 so that when the piston rod 8 is subject to torque the correspondingly aligned guides surfaces 35 are thrust against the associated groove flank 32 and are supported by same.

It is appropriate to associate preferably two, or at least two, guide rollers 24' and 25' with at least one prism side edge 22'. Such guide rollers are arranged at a distance apart in the longitudinal direction of the piston rod 8. The transverse supporting effect produced thereby for the piston rod 8 more particularly systematically prevents bending of the piston rod 8. The piston rod guide device 14 is in this respect preferably so aligned that the transverse forces acting on the piston rod 8 essentially in the guide plane 23 are substantially directed toward the prism side edge 22' acted upon by the at least two guide rollers 24' and 25'.

More particularly when the direction of the transverse forces occurring is as a rule hardly subject to any changes, it may be sufficient to provide merely one guide roller 36 for the opposite prism side edge 22, such roller being indicated in chained lines in FIG. 1. It preferably acts on the guide section 15 in the axial intermediate portion, which extends between the two guide rollers 24' and 25' associated with the other prism side edge 22'. The arrangement of the single guide roller 36 is in this case preferably in the middle of the respective intermediate portion.

However it is preferred to use a form of design, in which the other prism side edge 22 also has a plurality of, and more particularly two, guide rollers 24 and 25 associated with it (FIG. 1). In this respect the arrangement is preferably such that the guide rollers of both prism side edges are opposite to each other in pairs (24, 24'; 25 and 25') across the longitudinal axis 12. This means that the guide section 15 is clamped in place practically immovably at two axially spaced points. The axes of rotation 35 of a respective guide roller pair 24, 24'; 25 and 25' can be aligned parallel to each other in a common bearing plane at a right angle to the longitudinal axis 12.

For the sake of ensuring minimum friction while at the same time having a high load carrying capacity the guide rollers 24, 24'; 25 and 25' are designed in the form of an anti-friction bearing device in the illustrated working embodiment. Same respectively comprise a bearing pin 37 secured to the base 17 with two independently rotatable coaxial roller units 38 thereon.

Each roller unit 38 possesses an external guide ring 41, which is rotatably mounted on the bearing pin 37 by means of a merely diagrammatically indicated ring-like anti-friction bearing or rolling element arrangement 42. As rolling elements it is more particularly possible to utilize balls or rollers or, respectively, needles. Preferably a combined radial and axial bearing arrangement is employed in order to be able take all likely forces into account.

The above mentioned guide groove 28 is respectively provided in the intermediate portion between the two roller units 38 of a respective guide roller 36. The term "guide groove" is used herein in the sense of at least one circumferentially extending recess serving for guiding irrespectively of the fashion in which same is produced or set.

It is to be recommended to provide a possibility of adjustment in order to adapt the position or alignment of the guide rollers 24, 25; 24' and 25' or of any roller units 38 present to the actual outline of the guide section 15 and more particularly to be able to provide for play adjustment in accordance with requirements.

The piston rod 9 of the working embodiment illustrated is solid. It is however possible as well to utilize as hollow piston rod, whose interior shape corresponds to the exterior outline and is preferably also prismatic. Such a further development is indicated in broken lines in FIG. 2 at 43.

The power cylinder 1 of the embodiment of the invention is a so-called double-acting cylinder. Consequently the working space 6 adjacent to the bearing end plate 4 is charged with fluid under pressure in operation. In order to avoid escape of fluid through the opening 44 through which the piston rod 8 extends in the bearing end plate 4, a sealing ring 45 is set in this bearing end plate 4 preferably in the form of a lip sealing ring or a so-called groove ring, such sealing ring surrounding the piston rod 8 with sealing contact thereon. Its outline is preferably circular. In the sealing portion 46 engaging the piston rod 8 preferably possesses a peripheral shape corresponding to the outline of the prismatic piston rod 8.

The base 17 in the embodiment of the invention possesses a middle part 47 containing the housing chamber 27 and which is shut off and both ends by terminating walls 18 and 18'. The terminating wall 18 facing the piston 5 simultaneously constitutes bearing end plate 4. On the other terminating wall 18' having the piston rod 8 extending therethrough and facing the attachment adapter 11 it is possible, if appropriate, to provide a sealing device 49 as well in sealing contact with the piston rod 8 and preventing the ingress of dirt into the housing chamber 27 accommodating the guide rollers 24, 25; 24' and 25'.

Owing to its strength the base 18 is suitable for mounting on any desired support structure. Accordingly suitable fastening means or adaptations 48 for attachment are preferably provided on the base 17, for example holes, through which fastening bolts may be inserted.

I claim:

1. A fluid power cylinder comprising a piston rod guide device arranged at an end of the cylinder and through which a guide section of a piston rod extends, the piston rod guide device including at least one guide roller arrangement rollingly engaging the piston rod to provide for transverse support of the piston rod and ensure rotational locking of the piston rod around an axis thereof, wherein at least the guide section of the piston rod includes a prismatic configuration such that two prism side edges are diametrally opposite to one another in relation to a longitudinal axis of the piston rod and defining guide regions for cooperation with the guide roller arrangement, the guide roller arrangement having a peripherally extending guide groove into which a respective prism side edge fits so that surface portions of the guide section of the piston rod are supported by flanks of the associated guide groove, wherein the at least one guide roller arrangement comprises two independently rotatable roller units, which between them define the associated guide groove and the roller units are provided in a housing sealingly engaging the piston rod at opposite longitudinal ends of the housing, the housing providing means for shielding the guide roller arrangement from dirt and outside interference.

2. The fluid power cylinder as set forth in claim 1, comprising a plurality of guide roller arrangements for at least one of the two prism side edges, the guide roller arrangements being arranged with a spacing between them in the longitudinal direction of the piston rod.

3. The fluid power cylinder as set forth in claim 2, wherein the guide surfaces of both prism side edges are adapted to cooperate with two spaced apart guide roller arrangements, the guide roller arrangements being opposite to one another.

4. The fluid power cylinder as set forth in claim 1, wherein the guide roller arrangements include anti-friction bearing means.

5. The fluid power cylinder as set forth in claim 1, wherein at least the guide section of the piston rod possesses a square outline cross section.

6. The fluid power cylinder as set forth in claim 1, wherein the piston rod is hollow at least in the guide section thereof.

7. The fluid power cylinder as set forth in claim 1, wherein the piston rod guide device is attached to a bearing end plate of the cylinder housing.

8. The fluid power cylinder as set forth in claim 1, wherein the cylinder is a double acting fluid power cylinder.

9. A fluid power cylinder comprising a piston rod guide device arranged at an end of the cylinder and through which a guide section of a piston rod extends, the piston rod guide device including at least one guide roller arrangement rollingly engaging the piston rod to provide for transverse support of the piston rod and ensure rotational locking of the piston rod around an axis thereof, wherein at least the guide section of the piston rod includes a prismatic configuration such that two prism side edges are diametrally opposite to one another in relation to a longitudinal axis of the piston rod and defining guide regions for cooperation with the guide roller arrangement, the guide roller arrangement having a peripherally extending guide groove into which a respective prism side edge fits so that surface portions of the guide section of the piston rod are supported by flanks of the associated guide groove;

wherein the guide surfaces of one prism side edge are adapted to cooperate with two longitudinally spaded guide roller arrangements, and the other prism side edge has a further guide roller arrangement associated therein, the further guide roller arrangement being positioned in an axial position between the two other guide roller arrangements.

10. A fluid power cylinder comprising a piston rod guide device arranged at an end of the cylinder and through which a guide section of a piston rod extends, the piston rod guide device including at least one guide roller arrangement rollingly engaging the piston rod to provide for transverse support of the piston rod and ensure rotational locking of the piston rod around an axis thereof, wherein at least the guide section of the piston rod includes a prismatic configuration such that two prism side edges are diametrally opposite to one another in relation to a longitudinal axis of the piston rod and defining guide regions for cooperation with the guide roller arrangement, the guide roller arrangement having a peripherally extending guide groove into which a respective prism side edge fits so that surface portions of the guide section of the piston rod are supported by flanks of the associated guide groove;

wherein the at least one guide roller arrangement comprises two independently rotatable roller units, which between them define the associated guide groove.

11. A fluid power cylinder comprising:

a cylinder housing including a fluid duct;

a piston axially movable in the cylinder housing by means of fluid input into said fluid duct;

a piston rod attached to said piston;

a guide housing coupled to said cylinder housing, the guide housing being adapted to receive a guide section of the piston rod, at least the guide section of the piston rod having a prismatic configuration such that two prism side edges are diametrically opposite to one another in relation to a longitudinal axis of the piston rod; and a first and second pair of guide roller arrangements positioned within the guide housing, each of the first and second pair of guide roller arrangements including guide surfaces forming a pair of substantially V-shaped grooves for engaging opposite side edges of the guide section of the piston rod, wherein the first and second pair of guide roller arrangements are longitudinally spaced apart within the guide housing.

12. The fluid power cylinder as set forth in claim 11, wherein the guide housing includes sealing rings at opposite longitudinal ends thereof for sealingly engaging the piston rod, the guide housing providing means for shielding the guide roller arrangements from dirt and outside interference.

13. A fluid power cylinder comprising a piston rod guide device arranged at an end of the cylinder and through which a guide section of a piston rod extends, the piston rod guide device including a plurality of guide roller arrangements rollingly engaging the piston rod to provide for transverse support of the piston rod and ensure rotational locking of the piston rod around an axis thereof, wherein at least the guide section of the piston rod includes a prismatic configuration such that two prism side edges are diametrally opposite to one another in relation to a longitudinal axis of the piston rod and defining guide regions for cooperation with the guide roller arrangement, the guide roller arrangement having a peripherally extending guide groove into which a respective prism side edge fits so that surface portions of the guide section of the piston rod are supported by flanks of the associated guide groove, wherein the guide roller arrangement is provided in a housing sealingly engaging the piston rod at opposite longitudinal ends of the housing, the housing providing means for shielding the guide roller arrangement from dirt and outside interference, wherein the plurality of guide roller arrangements is associated with at least one of the two prism side edges, the guide roller arrangements being arranged with a spacing between them in the longitudinal direction of the piston rod, and further wherein the guide surfaces on the one prism side edge are adapted to cooperate with two spaced guide roller arrangements, whereas a further guide roller arrangement is associated with the other prism side edge, the further guide roller arrangement being positioned in an axial portion between the two other guide roller arrangements.

* * * * *